J. W. KAHL.
HAY RAKE.
APPLICATION FILED SEPT. 18, 1916.

1,221,541.

Patented Apr. 3, 1917.
3 SHEETS—SHEET 1.

J. W. KAHL.
HAY RAKE.
APPLICATION FILED SEPT. 18, 1916.

1,221,541.

Patented Apr. 3, 1917.
3 SHEETS—SHEET 2.

Inventor
J. W. Kahl

By
Attorney

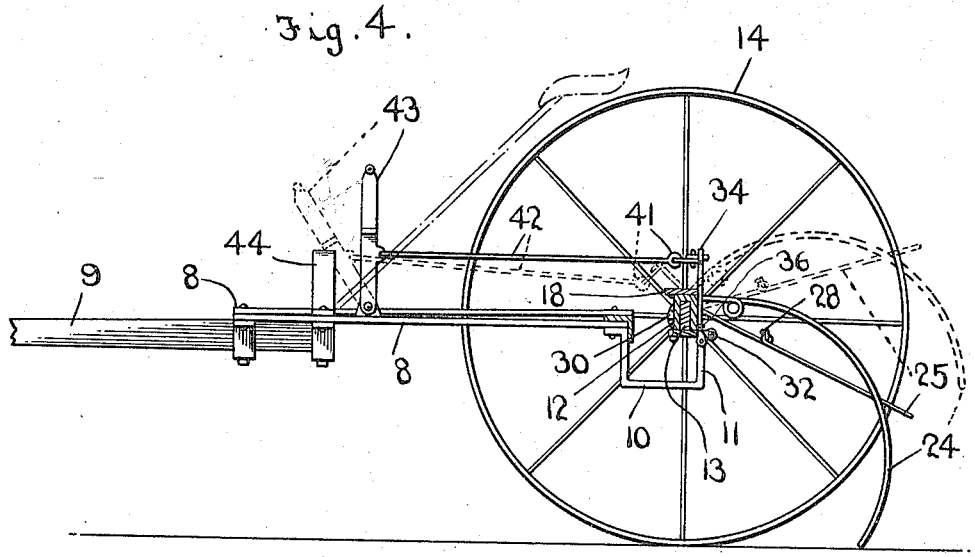
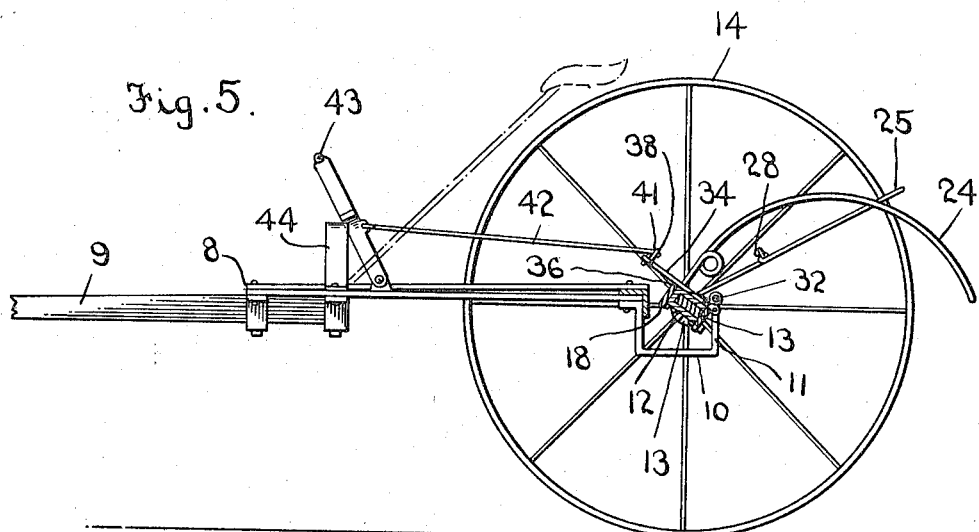

UNITED STATES PATENT OFFICE.

JOHN W. KAHL, OF OTISCO, INDIANA.

HAY-RAKE.

1,221,541. Specification of Letters Patent. Patented Apr. 3, 1917.

Application filed September 18, 1916. Serial No. 120,774.

*To all whom it may concern:*

Be it known that I, JOHN W. KAHL, a citizen of the United States, residing at Otisco, in the county of Clark and State of Indiana, have invented certain new and useful Improvements in Hay-Rakes, of which the following is a specification.

The present invention relates to hay rakes, and the object is to provide an extensible rake that will thus have a very considerable range of action, simple and effective means being provided whereby the rake can be easily contracted so that it will pass through an ordinary farm gate-way or travel along the ordinary road.

A further and important object is to provide a self-dumping rake under the control of the driver, the means being simple and yet very effective, and furthermore permitting the ready contraction and expansion of the rake as desired.

In the embodiment disclosed in the accompanying drawings,

Fig. 4 is a sectional view showing the teeth or tines in their operative or raking position.

Fig. 5 is a view similar to Fig. 4, but illustrating the tines elevated or in dumping position.

Fig. 6 is a detail perspective view showing a portion of the actuating means for the dumping mechanism.

Fig. 7 is a detail perspective view illustrating the manner in which the tines and clearer fingers are mounted.

Similar reference numerals designate corresponding parts in all the figures of the drawings.

Figure 1:
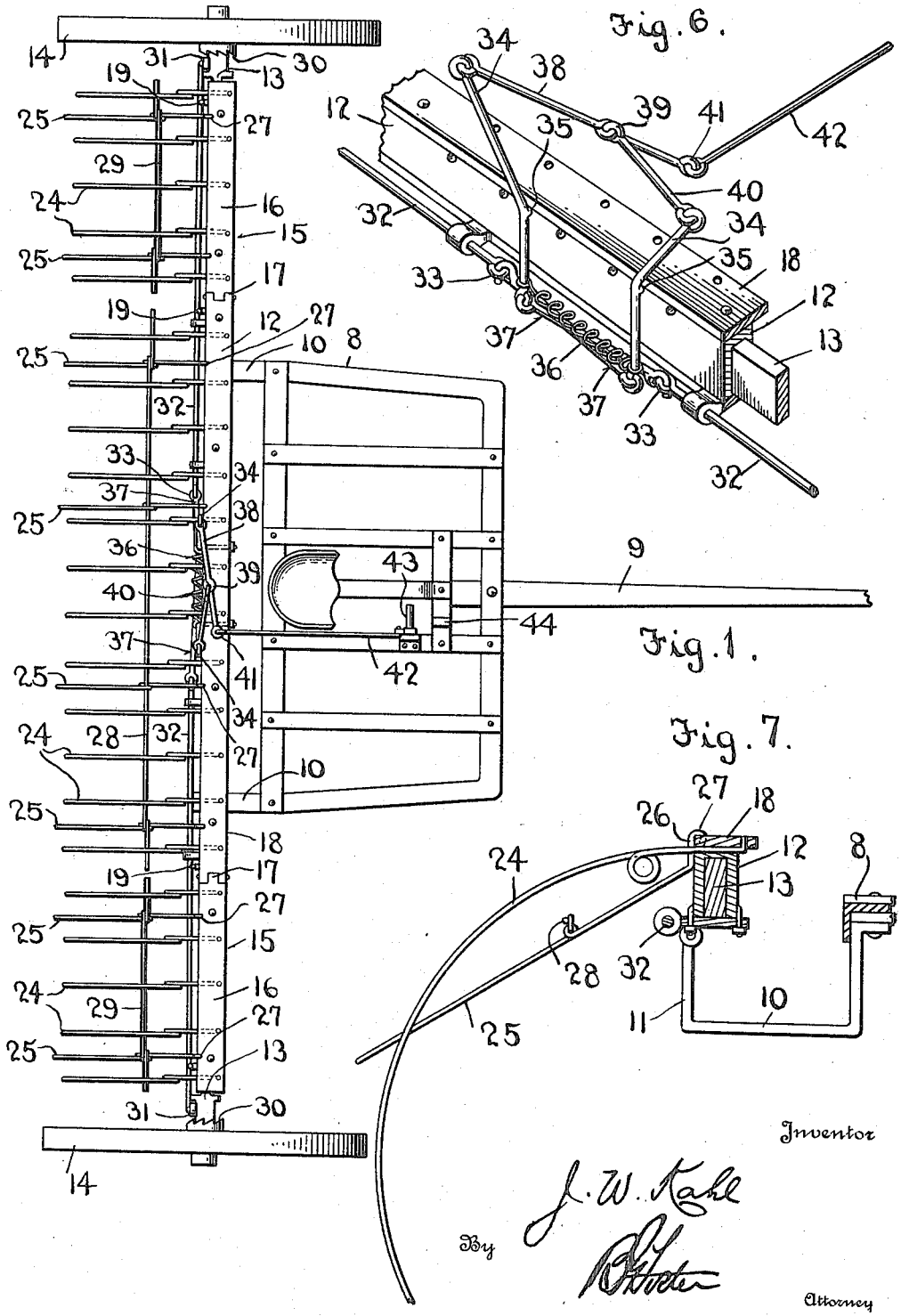
Figure 1 is a plan view of the rake in its extended arrangement.
Figure 2:
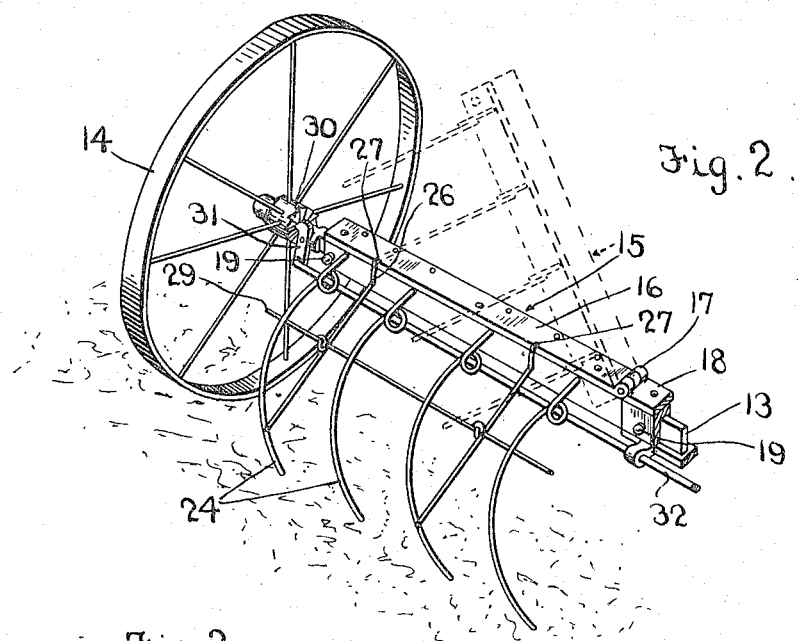
Fig. 2 is a detail perspective view of an end portion of the same, indicating the manner in which it is contracted.

In the embodiment illustrated, a suitable frame 8 is employed, which may be of any desired construction, and may have a tongue 9 or the usual single-horse shafts, as desired. The rear portion of this frame is provided with U-shaped extensions 10 having upturned rear ends 11 to which is pivoted a tubular support 12, this support in its normal position being located above the rear ends 11 of the extensions 10, as shown in Fig. 4. Slidably mounted in this tubular support is a pair of axle bars 13, on the outer ends of which are journaled the usual ground or supporting wheels 14.

Figure 3:
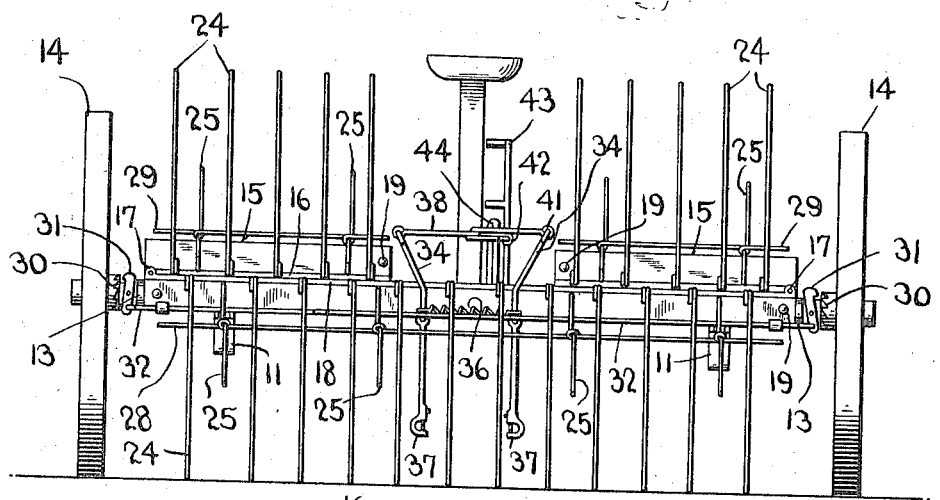
Fig. 3 is a rear elevation of the rake in contracted relation.
Figure 8:
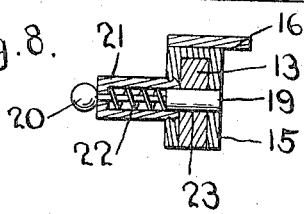
Fig. 8 is a detail sectional view showing one of the axle holding bolts.

Channel sections 15 are arranged to engage over the axles 13 when the latter are in their extended relation, and bars 16 fixed upon the channel sections, have hinged connections 17 with a bar 18 fixed upon the central tubular support 12. It will thus be seen that the sections may be folded over upon the tubular support, as shown in Fig. 3, and the axles moved inwardly, so that the structure is relatively narrow, or the axles may be extended, and when so extended, the channel sections can be swung thereover, as illustrated in Fig. 1. For the purpose of securing the axles both in their extended and retracted positions, bolts 19 are employed that are mounted on the ends of the tubular support 12, and also on the outer ends of the swinging channel sections 15. One of these bolts is illustrated in detail in Fig. 8, and it will be noted that it is in the form of a plunger having an actuating stem 20 which is slidable through a tubular casing 21, a spring 22 being located in the casing and bearing against the bolt to urge it to its operative position. The axle sections have openings 23 therethrough to receive these bolts.

The rake tines are designated 24, and may be of any desired character and shape. Some are carried by the tubular support 12, and others are mounted on the swinging end sections, as shown more particularly in Fig. 7. The tines that are mounted on the central support are clamped between the top bar 18 and said support, their terminals being upturned and engaged in openings in said top bar. The tines, which are carried by the folding end sections, are similarly clamped between the top bar 16 and the channel sections 15. Clearer fingers 25, also associated with the tines, have offset ends 26 bearing against the tubular support 12 and the end sections 15, these clearer fingers terminating in eyes 27 that are engaged in the top bars. The said clearer fingers of the tubular section are also connected by a longitudinal rod 28, and the clearer fingers of the end sections are likewise connected by rods 29, which serve to maintain them in properly spaced relation.

It will be evident that with this construction, the tubular support and axles are mounted so that they can partially revolve, and this partial revolution will carry them into the U-shaped extensions 10. This partial revolution will, of course elevate the rake tines. To secure this movement, means are provided for clutching the wheels and axles together, so that the turning of the wheel will turn the axles, and of course, the support. To this end, said wheels are provided on their inner side with clutch or ratchet teeth 30, and pivoted to the ends of the axle directly adjacent to the wheels are toothed dogs 31. To these dogs are connected slide rods 32 suitably mounted on the support and having eyes 33 at their inner ends. Levers 34 are pivotally mounted as shown at 35 on the central portion of the tubular support 12, and the lower ends of these levers are connected by a spring 36. Each lever also is provided with a snap hook 37, and the two snap hooks are adapted to be placed in crossed relation and engaged with the eyes 33 of the slide rods 32. To the upper end of one of the levers is connected a link 38 having between its ends an eye 39 to which is connected another link 40 that is connected to the other lever 34. The free end of the link 38 has a connection 41 with a draft rod 42, and said rod is in turn connected to a lever, preferably in the form of a treadle 43. Arranged in advance of said lever or treadle 43, and in the path of movement thereof, is a stop 44.

Briefly described, the operation of the structure is as follows: Assuming that the tines of the rake are in the position illustrated in Fig. 4, and it is desired to dump said rake, all that is necessary is for the operator to press forward upon the treadle or lever 43. This will cause the upper ends of the levers 34 to swing toward each other, and consequently cause the slide rods 32 to be drawn toward each other. This will swing the dogs 31 so that their teeth will engage the clutch teeth 30 of the wheels. The result will be that the wheels and axles will be connected, and as the wheels turn, the rake will be turned with them, and the tines elevated to the position illustrated in Fig. 5. As this movement takes place, the treadle 43 will of course advance farther, the operator maintaining his foot thereon until said treadle strikes the stop 44. The result is that the treadle will move no farther while the wheels and axles will continue to revolve. The operating means for the dogs, being thus stopped, the continued movement will cause said dogs to be disengaged from the clutch teeth 30 of the wheels, and the wheels being released, will again revolve independently of said axles. The operator then releasing the mechanism, the tines will reassume their original position.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In an implement of the character set forth, the combination with a support, of a bar thereon, tines clamped between the bar and support, and clearer fingers secured to the bar.

2. In an implement of the character set forth, the combination with a frame, of an extensible axle member pivotally connected to the frame, wheels journaled on the axle member, clutches for directly connecting the wheels and axle member to cause the latter to turn with and be turned by the wheels, extensible tine carrying means carried by the axle member and fixed thereto so as to turn with said axle member when the axle member and tine carrying means are extended and the axle member is clutched to the wheels, and means for operating the clutch means.

3. In an implement of the character set forth, the combination with a frame, of a supporting member pivoted to the frame, axles slidably and non-rotatably mounted in the supporting member, wheels journaled on the axles, means for clutching the wheels to the axles to cause the same and the support to turn therewith, tines carried by the support and turning therewith when the wheels are clutched to the axles, sections hinged to the support and fixed to turn therewith and with the axles, tines carried by the sections, and operating mechanism for the clutch means.

In testimony whereof, I affix my signature in the presence of two witnesses.

JOHN W. KAHL.

Witnesses:
 WILLIAM G. CONN,
 JAMES A. JOHNSON.

Copies of this patent may be obtained for five cents each, by addressing the "Commissioner of Patents, Washington, D. C."